United States Patent [19]
Kido

[11] Patent Number: 5,948,522
[45] Date of Patent: Sep. 7, 1999

[54] MAGNETIC RECORDING MEDIUM

[75] Inventor: Mamoru Kido, Yokohoma, Japan

[73] Assignee: Verbatim Corporation, Charlotte, N.C.

[21] Appl. No.: 08/957,456

[22] Filed: Oct. 24, 1997

[51] Int. Cl.$^6$ ..................................................... G11B 5/68

[52] U.S. Cl. .................. 428/323; 428/694 B; 428/900; 427/128

[58] Field of Search ............................. 428/323, 694 B, 428/900; 427/128

[56] References Cited

U.S. PATENT DOCUMENTS

| | | | |
|---|---|---|---|
| 5,073,439 | 12/1991 | Hashimoto et al. | 428/328 |
| 5,324,571 | 6/1994 | Koyama et al. | 428/212 |
| 5,340,635 | 8/1994 | Isobe et al. | 428/141 |
| 5,702,821 | 12/1997 | Murayama et al. | 428/425.9 |
| 5,705,253 | 1/1998 | Berg et al. | 428/141 |

*Primary Examiner*—Stevan A. Resan
*Attorney, Agent, or Firm*—Oblon, Spivak, McClelland, Maier & Neustadt, P.C.

[57] ABSTRACT

The present invention provides a magnetic recording medium having excellent durability under severe environment. The magnetic recording medium is provided with a flexible non-magnetic support, and a magnetic layer which is provided thereon and contains ferromagnetic powder and bonding agent. Vickers hardness Hv of the magnetic layer up to a certain indentation depth of an indentator is 12–20.

4 Claims, 1 Drawing Sheet

MAGNETIC RECORDING MEDIUM

BACKGROUND OF THE INVENTION

1. Field of the Invention

The present invention relates to a coated magnetic recording media such as a magnetic tape, a magnetic sheet or a magnetic disc used for audio equipment, video equipment, computer and so on.

2. Description of the Related Art

Magnetic recording media requires a flat surface, to avoid that reproduction output drops since spacing loss and a noise is generated by irregularities. Consequently, magnetic recording media for high density recording requires an extremely flat surface.

However, the flat surface causes a substantial contact area between the magnetic layer and each of parts in a recording-reproducing apparatus (id. tape recorder) to increase. The increased contact area enlarges a frictional force between the magnetic layer and the parts. Moreover, the increased contact area causes sticking of the magnetic head, which has a flat surface, with the magnetic layer to occur easily. That is, the flatter the surface is, the faster the magnetic layer wears and the more easily exfoliation occurs.

Consequently, to improve durability of the medium with a flat surface, conventionally, lubricant such as higher fatty acid or higher fatty acid ester is added into the magnetic layer or is coated on the surface of the magnetic layer, thereby lowing frictional force between the magnetic recording media and the magnetic head or the like. There is also a case that hard fine particles called for abrasive or filler.

However, only by applying durability improvement technology used so far, it is impossible to obtain magnetic recording media capable of keeping high durability under required severe environment (such as environment of low temperature and low humidity or high temperature and high humidity, environment of a high relative speed to a magnetic head).

SUMMARY OF THE INVENTION

It is an object of the present invention to solve the above described problems and to provide a magnetic recording medium showing excellent durability under severe environment and a method of manufacturing such the magnetic recording medium.

To achieve the above-described object, according to the present invention, a magnetic recording medium having a magnetic layer containing ferromagnetic powder and bonding agent on a flexible non-magnetic support is structured so that Vickers hardness Hv of the magnetic layer up to a certain indentation depth is 12–20.

BRIEF DESCRIPTION OF THE DRAWINGS

Other objects and advantages of the present invention will become apparent during the following discussion conjunction with the accompanying drawing, in which.

DETAILED DESCRIPTION OF THE PREFERRED EMBODIMENTS

Figure 1:
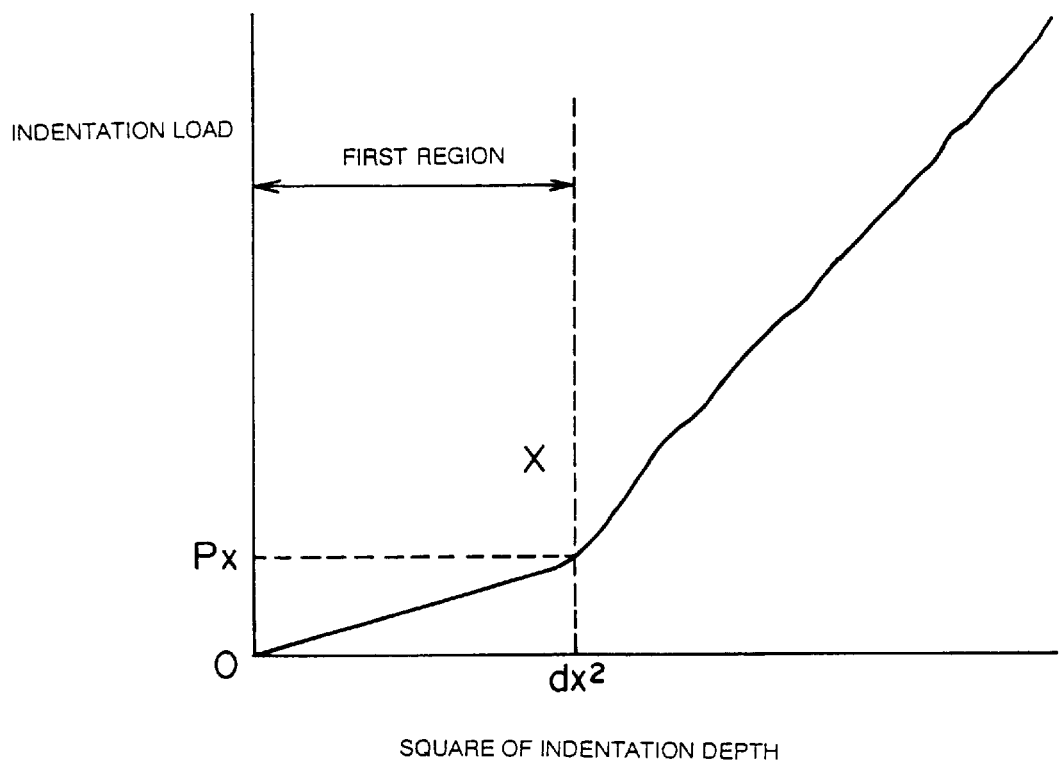
FIG. 1 is a graph showing a relation between the load P (gf) and the square $d^2$ of the indentation depth d.

Hereinafter, the present invention will be described in detail.

First, explanations are given of a method of measuring Vickers hardness and a relation between a load P (gf) and an indentation depth ($\mu$m) in measuring.

In the present invention, Vickers hardness Hv is measured by pushing, for example, an indentator of which a top is a diamond trigonal pyramid into the magnetic layer. At that time, the load P (gf), indentation depth ($\mu$m) and Vickers hardness Hv satisfy the following equation.

$$P = Hv/c \cdot d^2$$

where c is a constant determined by the angle between edges at the vertex of the indentator, c=1082.7 when the angle between edges at the vertex is 80°.

Thus, Vickers hardness Hv can be obtained from an slope in a graph showing a relation between the load P and $d^2$, square of the indentation depth d.

However, when an indentator is pushed into the magnetic layer of the magnetic recording medium, as shown in FIG. 1, a curve indicating the relation between an indentation load P and a square $d^2$ of an indentation depth d is approximated to two straight lines with an inflection point X. The straight line part in the first region in which the value of d is smaller than the value of d at the inflection point X, has a gentler slope than the straight line part in the remaining region.

The magnetic recording medium of the present invention is provided with a magnetic layer of which Vickers hardness obtained from the slope of the straight part in the first region is 12–20. That is, the magnetic recording medium is, for example, provided with a magnetic layer of which Hv obtained by an expression Hv=1082.7×Px/dx² based on the load Px and the indentation depth dx at the inflection point X is 12–20.

It is not obvious why magnetic recording media having such a property has extremely high durability. However, it is found that (I) in a magnetic recording medium manufactured under a condition making a void fraction large, a distance to the inflection point X (namely, value of dx) is large and the load Px at the inflection point X is small (Vickers hardness obtained by the value Px/dx² is small), (II) in a magnetic recording medium manufactured under a condition making a void fraction small, a distance to the inflection point X is small and the load Px at the inflection point X is large (Vickers hardness obtained by the value Px/dx² is large), and (III) there is a tendency that a frictional force becomes large during sliding with the head as Vickers hardness obtained from the value Px/dx² becomes large. Therefore, it is guessed that high durability of the magnetic recording medium are due to the following reasons.

A coated magmatic recording medium has a lot of minute cavity on the surface of the magnetic layer. These cavity reach the internal portion of the magnetic layer like as sponge cavity, and function as a supply source of lubricant. That is, when the magnetic layer slides on the magnetic head, lubricant seeps out of these cavity to the surface of the magnetic layer, thereby lowering friction coefficient between the magnetic layer and the magnetic head.

Consequently, as the void fraction in the surface of the magnetic layer is large, there is an advantage for supplying the lubricant. However, as the void fraction in the magnetic layer is larger, a mechanical intensity lowers. Thus, when the void fraction is too small, durability of the magnetic recording medium lowers by insufficient supply, however, when the void fraction is too large, durability lowers by insufficient mechanical intensity.

Therefore, to achieve excellent durability, it is necessary to make a magnetic recording medium having a suitable void fraction and a suitable mechanical intensity.

In the P-$d^2$ curve, the slope in the first region relates closely with the void fraction and the mechanical intensity, therefore, it is guessed that a magnetic recording medium having excellent durability can be obtained by making the slope 12–20.

Note that, in measuring Vickers hardness of the magnetic recording medium, when the indentator is indented at an extremely high speed, there is a possibility that the hardness can not be measured accurately, because a load detecting apparatus in the equipment can not follow increase of the load. Moreover, the load decreases as time passes due to viscoelasticity of the magnetic recording medium even if the indentation depth d of the indentator is kept constant. Consequently, when the indentator is pushed at an extremely low speed, the hardness can be measured accurately. Therefore, Vickers hardness should be measured at a suitable indentation speed.

Next, an explanation is given of a manufacturing procedure of a magnetic recording medium according to the present invention. First, an explanation is given of magnetic paint used to form the magnetic layer.

Magnetic paint includes any ferromagnetic powder. For example, it is possible to use iron oxide, and ferromagnetic alloy powder such as Fe—Co, Fe—Ni, Co—Ni, Fe—Co—Ni. The ferromagnetic alloy powder may include another element such as Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te and Bi.

Any shape and any size of the ferromagnetic powder can be used for the magnetic paint. However, to obtain a good electromagnetic transducing characteristic, it is desirable to use needle-shaped or plate-shaped ferromagnetic powder. Further, as to the size, to achieve high density recording, it is desired that, when metal powder is used, a primary particle diameter is not more than 0.1 $\mu$m and a BET specific surface are is not less than 30 $m^2/g$.

For high density recording, it tends to use magnetic powder of which a coercive force is large, and a desirable coercive force is 700–2500 Oe. Moreover, for high density recording, it is necessary to increase the ratio of the ferromagnetic powder in the magnetic layer. The magnetic layer, however, becomes weak when the ratio increases too much, whereby powder tends to fall. Thus, content of the ferromagnetic powder in the magnetic layer is set to 50–95 wt %, preferably, 70–90 wt %.

Bonding agent (binder resin) used for magnetic paint is also not limited. It is possible to use any of thermoplastic resin, thermosetting resin and radiation-setting resin which are conventionally used for magnetic recording media and to use mixture of these resins, if the adhesive property and the anti-friction property against a support are excellent. For instance, it is possible to use polyurethane resin, polyester resin, cellulose resin, vinyl chloride-vinyl acetate copolymer, vinyl chloride-acrylic copolymer, epoxy resin, phenoxy resin and so on, independently or in combination of not less than two kinds of them.

It is preferable that molecular weight of binder resin is twenty-thousands through two hundred-thousands, particularly, thirty-thousands through one hundred-thousands.

The following is the reasons.

Binder resin whose molecular weight is less than twenty-thousands offers low viscosity has insufficient shearing force in kneading and dispersing processes. Consequently, use of such binder resin makes it difficult to obtain well-dispersed magnetic paint. On the contrary, binder resin whose molecular weight is more than two hundred-thousands offers high viscosity. Therefore, the magnetic paint using such binder resin is too viscous to be coated onto a non-magnetic support without a film break.

To form a magnetic layer having Vickers hardness specified in the present invention, it Is necessary to reduce the void fraction of the magnetic layer (to increase a filling ratio of the magnetic layer). Thus, it is desirable to use binder resin including a polar functional group such as —COOH, —SO$_3$M, —OSO$_3$M, —PO$_3$M$_2$, —OPO$_3$M$_2$, —N$_+$RR'R"X. Note that, M indicates hydrogen ion, alkali metal ion, and substituted or non-substituted ammonium ion. R, R', R" indicate hydrogen or aliphatic hydrocarbon group, and these may be equal and different one another. X indicates halogen.

By using such binder resin, it is possible to improve dispersibility of ferromagnetic powder and other filling particles, so that the filling ratio of the magnetic layer can be improved.

Additionally, binder resin is used in a manner that contents in the magnetic layer is 2–50 wt %, preferably, 5–35 wt %.

When magnetic recording media of the present invention are manufactured, the magnetic paint may include low molecular polyisocyanate compound having plural isocyanate groups. When the magnetic paints includes low molecular polyisocyanate compound, it is possible to form a magnetic layer having three-dimensional network structure, therefore, it is possible to improve the mechanical intensity of the magnetic layer. Note that, trimethylol propane adduct of toluene diisocyanate may be used as low molecular polyisocyanate compound. It is desirable to use 5–100 weight part of low molecular polyisocyanate compound to 100 weight part of binder resin.

It may be possible to blend additive such as lubricant, abrasive, dispersant and antistatic agent into magnetic paint.

Materials used as lubricant may be saturated or no-saturated fatty acid and chloride thereof, fatty acid amid, fatty acid ester, higher fatty alcohol, higher fatty amine, paraffins, denatured or no-denatured silicone oil, flora-fauna oil, mineral oil, perfluoropolyether, and fluorocarbon. As to the usage thereof, when lubricant is added into magnetic paints, it is suitable that 3–10 weight part of lubricant is added to 100 weight part of ferromagnetic powders. When lubricant is top-coated on the surface of magnetic layer, it is suitable to use 20–100 mg of lubricant per 1 $m^2$ of the magnetic layer area.

Materials used as abrasive may be hard fine-particle such as Al$_2$O$_3$, SiO$_2$, SnO$_2$, TiO$_2$, Cr$_2$O$_3$ and $\alpha$-Fe$_2$O$_3$. It is also possible to use inorganic fine-powders such as graphite, MoS$_2$ and thermal carbon or resin fine-powder such as silicon resin, polyethylene and polytetrafluoroethylene, which provide excellent abrasion resistance and lubricity. Not to degrade electromagnetic transducing characteristics, it is desirable that these powders are fine, namely, the particle diameter thereof is 0.05–0.5 $\mu$m. As to the usage thereof, it is suitable that 3–10 weight part of abrasive is added to 100 weight part of ferromagnetic powders.

Materials used as dispersant may be such as fatty acid and chloride thereof, fatty acid amid, higher alcohol, fatty amine, polyalklene oxide, alkyl acid ester, saccharide, lecithin. As to the usage of dispersant, it is suitable that 0.1–5 weight part of dispersant is added to 100 weight part of ferromagnetic powders.

Materials used as antistatic agent may be antistatic agent such as carbon black, SnO$_2$, TIO and metal powders, non-ionic surface active agent such as alkaline oxide, cationic surface active agent such as phosphonium and sulfonium, anionic surface active agent such as carboxylic acid, phosphorus acid, sulfuric acid ester, phosphorus acid ester, or amphoteric surface active agent such as amino acid and amino sulfonic acid. As to the usage of antistatic agent, it is suitable that 0.1–10 weight part of antistatic agent is added to 100 weight part of ferromagnetic powders.

Practically, there are cases in that materials classified as lubricant in the above description also function as dispersant. Thus, when additive having plural functions is used, the usage thereof is determined by taking these functions into consideration.

Next, an explanation is given of a concrete procedure of manufacturing magnetic recording media.

First, by mixing, kneading and dispersing ferromagnetic powders, binder resin and lubricant with solvent, and by adding other additive therein if necessary, magnetic paint is made.

As solvent, it is possible to use conventional magnetic paint not to limited. There is no limitation as to mixing, kneading and dispersing methods and apparatus therefor. It is possible to set an adding order of each component flexible. However, a preferred procedure of manufacturing magnetic paint is shown as follows.

First, ferromagnetic powders, urethane resin and lecithin are put into a kneading apparatus, and then methyl ethyl ketone is added to this in a manner that the solvent concentration becomes 20–50 wt %. Then, kneading of 50–300 seconds, preferably, 100–200 seconds is carried out in a state that the maximum of shearing speed is not more than $1.0 \times 10^2$ (sec$^{-1}$), preferably, $5.0 \times 10^2$ (sec$^{-1}$). Remaining materials are put into this, and then these are dispersed by a grinder so as to form magnetic paint.

The magnetic paint made in this way is filtrated by a suitable filter, thereafter, is coated onto a flexible non-magnetic support with a die coater or the like.

As a flexible non-magnetic support, it is possible to use polyester such as polyethylene terephthalate, polyethylene-2 and 6-naphthalene, polyolefin such as polyethylene, cellulose derivative such as cellulose triacetate, resin such as polycarbonate, polyimide and poly amide-imide, and metallic foil such as aluminum foil. Aspects of the flexible non-magnetic support are a tape, a disc, a film, a sheet, a card, a drum and so on.

The magnetic paint may be directly coated onto the support, and may be also coated through a intermediate layer such as an adhesive layer and a conductive layer. The magnetic paint is coated to the support in a manner that the thickness of the magnetic layer to be formed is 0.1–2 μm, preferably, 0.2–1.5 μm.

The magnetic layer coated onto the non-magnetic support, when a tape-shaped magnetic recording medium is manufactured, is dried after a magnetic field orientation process so that ferromagnetic powders in the magnetic layer are oriented. When a disc-shaped magnetic recording medium is manufactured, the magnetic layer is dried after a randomized process so that the directional dependency of the magnetic characteristics is taken out. Then, a surface flatting process is applied to the dried magnetic recording media by a calender. A thermosetting process and a radiation-setting process are applied to the magnetic recording media if necessary, thereafter, the magnetic recording media are cut to be suitable shapes.

In view of points of the present invention to obtain high density recording media, it is desirable that the calendar process is performed under a condition in that surface roughness of the magnetic layer is not more than 0.01 μm as to Ra. It is also desirable that magnetic paint composition (such as shape and quantity of abrasive) is made in a manner that such surface characteristics can be obtained.

As already explained, by using binder resin including polar functional groups such as sulfonic acid group, it is possible to control the void fraction of the magnetic layer so as to obtain the Vickers hardness specified in the present invention. It is also possible to control the void fraction of the magnetic layer by mechanically varying the filling degree of the magnetic layer. In other words, by changing the temperature and the pressure for the calender process, it is possible to control the void fraction of the magnetic layer.

Moreover, when a low void fraction is kept by using binder resin including polar functional groups, by applying the calender process, it is also possible that the magnetic recording media provide Vickers hardness specified in the present invention.

As above discussed, there are various method of manufacturing magnetic recording media having Vickers hardness specified in the present invention. Though magnetic recording media are manufactured by any method, they provide excellent durability under hard environment.

Next, a concrete explanation is given of that magnetic recording media having Vickers hardness specified in the present invention provide excellent durability with reference to experiment results.

First, an explanation is given of manufacturing procedure of an sample used for the experiment (magnetic recording tape).

In the experiment, to obtain magnetic recording tapes of which Vickers harnesses are different one another, several kinds of magnetic paints of the following composition ratios were made by using various resins.

| Magnetic Paint Composition (Weight Part) | |
|---|---|
| Co-γ-Fe$_2$O$_3$ powder (coercive force: 9000e, BET specific surface area: 30 m$^2$/g) | 100 |
| vinyl chloride resin (MR110 or MR113) | 12 |
| urethane resin (UR8200 or UR8300) | 12 |
| lecithin | 1 |
| alumina fine particle (average particle diameter 0.3 μm) | 5 |
| carbon black (average particle diameter 0.03 μm) | 8 |
| butyl stearate | 5 |
| methyl ethyl ketone | 195 |
| cyclohexanone | 195 |

Concretely, each magnetic paint was made in accordance with the following procedure. First, dispersion was applied to compound of the above composition by a sand grinder with zirconia bead of 1 mmΦ about three minutes. 5 weight part of polyisocyanate (trade name "Colonate L" produced by Nippon Polyurethane Company) is added to the dispersed compound and the compound was further mixed and dispersed flatly, whereby magnetic paint is obtained.

Then, each magnetic paint, after being passed through a filter of which an average absolute rating is 2 μm, was coated onto a polyester film of a thickness of about 7 μm so that a thickness of a magnetic layer after drying becomes 1.5–2 μm.

Afterwards, the film to which magnetic paint was coated was dried and the calender process was carried out to the dried film under a preselected condition. Then, the calender processed film was thermoset for 48 hours at 60° C. and then was cut out to 6.35 mm in the width, whereby various magnetic recording tapes were obtained for evaluation.

Vickers hardness was measured with the thin film hardness meter "MHA-400" manufactured by NEC Co. by pushing a diamond trigonal pyramid indentator whose angles between edges at vertex are 80° into the magnetic layer surface of each magnetic recording tape at a pushing speed of 10.5 nm/sec. In this case, it was assumed that Vickers hardness was a value by multiplying 1082.7 by slope Px/dx² of a segment between an origin and an inflection point X in a curve in which relations between pushing load P and square d² of indentation amount were plotted. Vickers hardness was measured 10 times for each sample.

Moreover, to evaluate durability in a real device, each manufactured magnetic recording tape was built in a cartridge and a ¼ inch tape cartridge for an actual recorder (Jumbo700; running speed of magnetic recording tape is 90 inch/min.). In this case, before forming the cartridge, a signal of a predetermined pattern was recorded into the magnetic recording tape with another device.

Then, Jumbo700 made each formed cartridge run in both directions 2500 times. Thereafter, reading error ratios to all record signals were measured before running and after running 5000 times.

Table 1 shows the obtained results.

As shown in Table 1, as to cartridges (example 1–3) using magnetic recording tapes of which Vickers harnesses are 12–20, the error rate vary not particularly, even if running 5000 times. On the other hand, as to cartridges (example 4, 5) using magnetic recording tapes of which Vickers harnesses are not in the above-mentioned range, error rate after running 5000 times are extremely large.

That is, a magnetic recording medium which has Vickers hardness specified in the present invention provides excellent durability.

Moreover, as shown by the examples 1–3, it is possible to manufacture a magnetic recording tape whose Vickers hardness is 12–20 under various conditions. In other words, only if Vickers hardness Hv of the magnetic layer in a case that a pushing amount of the indentator is almost surface vicinity becomes 12–20 when magnetic recording medium of the present invention is manufactured, any manufacturing procedure can be used.

TABLE 1

| | ※1 VINYL CHLORIDE RESIN | ※2 URETHANE RESIN | CALENDER CONDITION | | VICKERS HARDNESS | | | dx | ERROR RATE (NUMBER/Mbyte) | |
| | | | TEMPERATURE (°C.) | LINEAR PRESSURE (kg/cm) | MINIMUM | MAXIMUM | AVERAGE | (μm) | BEFORE | AFTER |
|---|---|---|---|---|---|---|---|---|---|---|
| PRESENT INVENTION | | | | | | | | | | |
| 1 | A | C | 100 | 400 | 12 | 16 | 14.2 | 0.32 | 0.11 | 0.18 |
| 2 | A | D | 90 | 300 | 14 | 18 | 15.6 | 0.30 | 0.11 | 0.15 |
| 3 | B | C | 90 | 300 | 16 | 20 | 18.3 | 0.29 | 0.11 | 0.14 |
| COMPARATIVE EXAMPLE | | | | | | | | | | |
| 4 | A | C | 60 | 200 | 6 | 12 | 8.2 | 0.37 | 0.12 | 0.70 |
| 5 | B | D | 100 | 400 | 18 | 30 | 24.6 | 0.25 | 0.10 | 0.57 |

VINYL CHLORIDE RESIN
A: VINYL CHLORIDE INCLUDING POLAR GROUP-ACRYLIC COPOLYMER (MR110 PRODUCED BY NIPPON ZENEON CO.)
B: VINYL CHLORIDE INCLUDING POLAR GROUP-ACRYLIC COPOLYMER (MR113 PRODUCED BY NIPPON ZENEON CO.)
URETHANE RESIN
C: POLYURETHANE RESIN INCLUDING POLAR GROUP ($SO_3Na$) (UR8200 PRODUCED BY TOYO BOSEKI CO., MOLECULAR WEIGHT 18000–30000)
D: POLYURETHANE RESIN INCLUDING POLAR GROUP ($SO_3Na$) (UR8300 PRODUCED BY TOYO BOSEKI CO., MOLECULAR WEIGHT 28000–36000)

What is claimed is:

1. A magnetic recording medium having a flexible non-magnetic support, and a magnetic layer containing ferromagnetic powder and bonding agent characterized in that Vickers hardness Hv of the magnetic layer is 12–20 gf/$\mu m^2$, wherein the Vickers hardness Hv (gf/$\mu m^2$) is defined as:

$$Hv = 1082.7 \times \Delta P/\Delta d^2,$$

where $\Delta P/\Delta d^2$ is a slope of P versus $d^2$ curve, the curve is approximate to two straight lines of different slopes with an inflection point, where P (gf) is a load added to a diamond trigonal pyramid indentator with an angle of 80° between edges at vertex when the indentator is pressed to the magnetic layer at a rate of 10.5 nm/sec, and where d ($\mu m$) is an indentation depth of the indentator into the magnetic layer, the value of d is smaller than the value of d at the inflection point.

2. A magnetic recording medium according to claim 1, wherein a content ratio of the ferromagnetic powder in the magnetic layer is 50–95 wt %.

3. A method of manufacturing a magnetic recording medium having a flexible non-magnetic support, and a magnetic layer containing ferromagnetic powder and bonding agent characterized in that the magnetic recording medium is manufactured in a manner that Vickers hardness of the magnetic layer is 12–20 gf/$\mu m^2$, wherein the Vickers hardness Hv (gf/$\mu m^2$) is defined as:

$$Hv = 1082.7 \times \Delta P/\Delta d^2,$$

where $\Delta P/\Delta d^2$ is a slope of P versus $d^2$ curve, the curve is approximate to two straight lines of different slopes with an inflection point, where P (gf) is a load added to a diamond trigonal pyramid indentator with an angle of 80° between edges at vertex when the indentator is pressed to the magnetic layer at a rate of 10.5 nm/sec, and where d ($\mu$m) is an indentation depth of the indentator into the magnetic layer, the value of d is smaller than the value of d at the inflection point.

4. A method according to claim 3, wherein a content ratio of ferromagnetic powder in the magnetic layer is 50–95 wt %.

* * * * *